3,773,829
PROCESS FOR PREPARING ACYL ISOCYANIDE
DICHLORIDES
Kurt Findeisen, Leverkusen, and Kuno Wagner, Leverkusen-Steinbuchel, Germany, assignors to Bayer Aktiengesellschaft, Leverkusen, Germany
No Drawing. Filed Dec. 30, 1971, Ser. No. 214,385
Claims priority, application Germany, Jan. 5, 1971,
P 21 00 219.7
Int. Cl. C07c *103/02*
U.S. Cl. 260—544 C  8 Claims

ABSTRACT OF THE DISCLOSURE

Acyl isocyanide dichlorides are prepared by reacting isocyanide dichlorides of the formula $$R^1-CCl_2-N=CCl_2$$

with an aldehyde at a temperature of from 0 to 300° C. in the presence of a Lewis acid.

BACKGROUND

This invention relates to a process for the production of acyl isocyanide dichlorides and dihalogen compounds.

SUMMARY

It has surprisingly been found that acyl isocyanide dichlorides can be obtained, in high yields in a smooth reaction, by reacting an aldehyde of the general formula $$R-CHO$$

in which R represents hydrogen; a lower alkyl radical; a lower haloalkyl radical; a lower alkyl radical substituted by nitro, lower alkoxy or carbalkoxy groups; a cycloalkyl radical, optionally substituted by halogen, lower alkyl, alkoxy or carboalkoxy groups; an aryl radical optionally substituted by halogen, nitro, lower alkyl, alkoxy or carboalkoxy groups or CN, COCl or SO₂Cl groups; or a heterocylic radical optionally substituted by halogen, nitro-nitrile, COCl, SO₂Cl, lower alkyl, alkoxy or carboalkoxy groups, with an isocyanide dichloride of the general formula $$R^1-CCl_2-N=CCl_2$$

in which $R^1$ represents halogen; a lower alkyl radical; a lower haloalkyl radical; an α-dichloromethyl isocyanide dichloride radical; an aryl radical, optionally substituted by halogen, lower alkyl, alkoxy or by a nitro group; or a 5- or 6-membered nitrogen-containing heterocyclic radical optionally substituted by halogen atoms, at a temperature of from 0 to 300° C. in the presence of a Lewis acid.

The acyl isocyanide dichlorides have the general formula $$R^1-CO-N=CCl_2$$

wherein $R^1$ is as defined above except that an α-carbonyl isocyanide dichloride radical replaces the α-dichloromethyl isocyanide dichloride.

DESCRIPTION

The reaction is preferably carried out at a temperature of from 50 to 200° C., most preferably at a temperature of from 80 to 150° C.

The Lewis acids which can be used for the process according to the invention are known from G. A. Olah, "Friedel-Crafts and Related Reactions," volume 1, pages 25-30, J. Wiley & Sons, 1963.

In addition to bromine and fluorine, chlorine is a preferred halogen atom (R and R¹). Lower alkyl radicals contain 1 to 8, preferably 1 to 4, carbon atoms and can optionally be substituted by the aforementioned halogen atoms. Aliphatic radicals naturally include cycloaliphatic radicals as well, preferably having 5 or 6 carbon atoms in the ring system.

Preferred optionally substituted cycoalkyl radicals (R) are those having 3 to 12, most preferably 5 or 6, carbon atoms in the ring system.

Naphthyl and phenyl radicals are a preferred optionally substituted aryl radicals. Substituents on the aryl radical include the aforementioned halogen atoms as well as the aforementioned lower alkyl and corresponding alkoxy Other possible substituents on the aryl radical R include nitro, nitrile, COCl, SO₂Cl and lower carboalkoxy groups.

5- or 6-membered heterocyclic radicals optionally substituted by halogen atoms (fluorine, chlorine or bromine) include those having nitrogen, oxygen or sulphur as hetero atoms in the heterocyclic ring system. The heterocyclic ring systems can also be anellated with a benzene ring system.

Substituents on the heterocyclic ring system, or on the benzene ring system anellated to it, include the aforementioned halogen atoms as well as the aforementioned lower alkyl and corresponding alkoxy groups. Other substituents include nitro, nitrile, COCl, SO₂Cl and lower carboalkoxy groups.

Examples of aldehydes include formaldehyde, acetaldehyde, trichloro acetaldehyde, propionaldehyde, butyraldehyde chloral, cyclohexane aldehyde, cyclopentane aldehyde, benzaldehyde, p-methoxybenzaldehyde, o-methoxybenzaldehyde. m-chlorobenzaldehyde, 3,5-dichlorobenzaldehyde, p-bromobenzaldehyde, p-nitrobenzaldehyde, naphthaldehyde-(1) and naphthaldehyde-(2).

If desired, the reaction can also be carried out with polymers of the aldehydes, such as paraformaldehyde, trioxane, paraldehyde and trimeric isobutyraldehyde etc.

Examples of suitable solvents in which the reaction can be carried out include chlorobenzene, dichlorobenzene, trichlorobenzene, dioxan, tetrahydrofuran, benzene, toluene, xylene, trichloromethyl isocyanide dichloride or one of the other reagents.

If the reaction is carried out under pressure, it is also possible to use low-boiling solvents, such as carbon tetrachloride, chloroform and higher-halogenated hydrocarbons. In general, the reaction is carried out in the absence of a solvent.

The process is carried out in a simple manner by combining the reaction components with the Lewis catalysts, followed by heating to the reaction temperature. In general, the molar ratio will be 1:1.

The process is illustrated with reference to the following example:

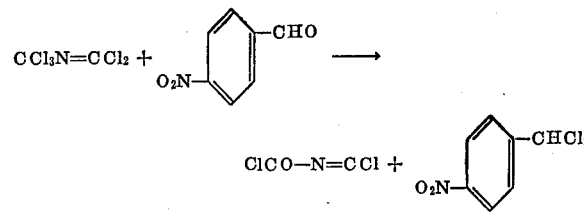

The stoichiometric quantities of trichloromethyl isocyanide dichloride and p-nitrobenzaldehyde are heated for 4 hours at 140° C. in the presence of a catalytic amount of ferric chloride. The reaction is over after 4 hours, and p-nitrobenzalchloride and chlorocarbonyl isocyanate dichloride can be obtained in high yields by distillation.

The reaction involves the transfer of oxygen from the aldehyde to the isocyanide dichloride, and the transfer of chlorine from the isocyanide dichloride to the aldehyde.

Lewis acids particularly suitable for use in the process include aluminium chloride, ferrous chloride, ferric chloride, stannous chloride, stannic chloride, antimony trichloride, antimony pentachloride, boron trifluoride, boron trifluoride etherate, zinc(II)chloride, hydrogen chloride, and aluminium chloride hydracid.

The compounds produced by the process according to the invention, some of which are extremely difficult to obtain by other methods, constitute valuable intermediates for the production of pesticides, dyestuffs and plastics. They can also be directly used as plant protection agents. The temperatures quoted in the following examples are in ° C.

Example 1

107.5 g. of trichloromethyl isocyanide dichloride and 74 g. of chloral are combined in a 100 ml-capacity three-necked flask. 5 g. of ferric chloride is used as catalyst. The reaction mixture is heated for 3 hours at 150° C. Thereafter, the reaction products are purified by fractional distillation, giving:

65 g. of chlorocarbonyl isocyanide dichloride (81% of the theoretical), B.P.: 125° C./760 torr, and
79 g. of pentachloroethane (78% of the theoretical), B.P.: 162° C./760 torr.

Example 2

28 g. of paraformaldehyde are suspended in 200 ml. of o-dichlorobenzene in a 500 ml-capacity three-necked flask, and converted into gaseous formaldehyde at 140° C.

The formaldehyde is introduced with a gentle stream of nitrogen into a 250 ml. three-necked flask in which 50 ml. of trichloromethyl isocyanide dichloride and 3 g. of ferric chloride have previously been heated to 110° C. The methylene chloride formed during the reaction is directly distilled off through a distillation bridge mounted on top of the flask. The residue is fractionated, giving:

18 g. of methylene chloride (91% of the theoretical), B.P. 41° C./760 torr, and
32 g. of chlorocarbonyl isocyanide dichloride (72% of the theoretical), B.P. 126°/760 torr.

Example 3

A mixture of 107.5 g. of trichloromethyl isocyanide dichloride, 53 g. of benzaldehyde and 3 g. of zinc chloride is heated over a period of 1 hour to a temperature of 120° C. and then, over another hour, to a temperature of 150° C. at which it is stirred for another 3 hours. The reaction mixture is separated by fractional distillation, giving:

77 g. of benzal chloride (96% of the theoretical), B.P. 205° C./760 torr and,
63 g. of chlorocarbonyl isocyanide dichloride (78.5% of the theoretical), B.P. 126° C./760 torr.

Example 4

107.5 of trichloromethyl isocyanide dichloride, 75.5 g. of p-nitrobenzaldehyde and 5 g. of ferric chloride are heated for 4 hours at 140° C. in a 250 ml.-capacity three-necked flask as a result of which refluxing begins. The reaction mixture is subjected to fractional distillation, giving:

96 g. of p-nitrobenzal chloride (93% of the theoretical), B.P.: 42° C./760 torr, and
63 g. of chlorocarbonyl isocyanide dichloride (79% of the theoretical), B.P. 126° C./760 torr.

Example 5

28 g. of formaldehyde are introduced as described in Example 2 into a mixture of 50 g. pentachloroethyl isocyanide dichloride and 2 g. of ferric chloride at 130° C. The methylene chloride that is generated is distilled from the reaction mixture through a Liebig condenser. The residue is fractionated, giving:

31.8 g. of trichloromethyl carbonyl isocyanide dichloride (78% of the theoretical), B.P.: 80–82° C./12 torr, and
12.0 g. of methylene chloride (84% of the theoretical), B.P. 41° C./760 torr.

What is claimed is:
1. Process for preparing acyl isocyanide dichlorides of the general formula

$$R^1\text{—CO—N}=CCl_2$$

wherein $R^1$ is chlorine which comprises reacting trichloromethyl isocyanide dichloride at a temperature of from 0 to 300° C. and in the presence of a Lewis acid, with an aldehyde of the formula $$R\text{—CHO}$$

wherein R is selected from the group of hydrogen; alkyl, haloalkyl, nitro alkyl, alkoxyalkyl, carboalkoxyalkyl, cycloalkyl, cycloalkyl substituted by halogen, alkyl, alkoxy or carboalkoxy, aryl, aryl substituted by halogen, nitro, alkyl, alkoxy, carboalkoxy, —CN, —COCl or $SO_2Cl_3$; a heterocyclic radical; or a heterocyclic radical substituted by halogen, nitro, alkyl, alkoxy, carboalkoxy, —CN, —COCl or —$SO_2Cl$.

2. Process of claim 1 wherein said aldehyde is selected from the group of formaldehyde, acetaldehyde, trichloroacetaldehyde, propionaldehyde, butyraldehyde, chloral, cyclohexane aldehyde, cyclopentane aldehyde, benzaldehyde, p-methoxybenzaldehyde, o-methoxybenzaldehyde, m-chlorobenzaldehyde, 3,5-dichlorobenzaldehyde, p-bromobenzaldehyde, p-nitrobenzaldehyde, naphthaldehyde-(1), naphthaldehyde-(2), paraformaldehyde, trioxan, paraldehyde, and trimerized isobutyraldehyde.

3. Process of claim 1 wherein the reaction is carried out in the presence of a solvent.

4. Process of claim 3 wherein the solvent is selected from the group of chlorobenzene, dichlorobenzene, trichlorobenzene, dioxan, tetrahydrofuran, benzene, toluene, xylene, trichloromethyl isocyanide dichloride and an excess of one of the reactants.

5. Process of claim 3 wherein the reaction is carried out at elevated pressure and the solvent is selected from the group of carbon tetrachloride, chloroform and higher halogenated hydrocarbons.

6. Process of claim 1 wherein the Lewis acid is selected from the group of aluminum chloride, ferrous chloride, ferric chloride, stannous chloride, stannic chloride, antimony pentachloride, antimony trichloride, boron trifluoride, boron trifluoride etherate, zinc chloride, hydrogen chloride and aluminum chloride hydracid.

7. Process of claim 1 wherein the temperature is from 50 to 200° C.

8. Process of claim 1 wherein the temperature is from 80 to 150° C.

References Cited

FOREIGN PATENTS 1,290,138   3/1969   Germany.

OTHER REFERENCES

Hagedhorn et al.: Chem. Ber. 98(3) 936–40 (65), (Ger.) C.A., vol. 62 (1965), 14561w.

Kühle: Angew. Chem. Internat. Edit., vol. 8, (1969), No. 1, pp. 20–34.

Holtschmidt: Angew. Chem. Internat. Edit., vol. 1 (1962), No. 12, pp. 632–640.

Saegusa et al.: Tetrahedron, vol. 24, pp. 3795–3798 (1967).

LORRAINE A. WEINBERGER, Primary Examiner

R. D. KELLY, Assistant Examiner

U.S. Cl. X.R.

260—558 R, 559 R, 561 HL